United States Patent
Sato

(10) Patent No.: US 8,160,635 B2
(45) Date of Patent: Apr. 17, 2012

(54) COMMUNICATION NETWORK SYSTEM AND COMMUNICATION METHOD THEREOF

(75) Inventor: Takeshi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 438 days.

(21) Appl. No.: 12/425,551

(22) Filed: Apr. 17, 2009

(65) Prior Publication Data

US 2009/0264081 A1 Oct. 22, 2009

(30) Foreign Application Priority Data

Apr. 18, 2008 (JP) .................... 2008-108494

(51) Int. Cl.
*H04B 7/00* (2006.01)
(52) U.S. Cl. .......................... 455/524; 455/40
(58) Field of Classification Search .......... 455/40, 455/524, 7, 500; 379/175; 370/546
See application file for complete search history.

(56) References Cited

U.S. PATENT DOCUMENTS

| 3,867,715 | A  | * | 2/1975 | Geil | 367/132 |
| 7,877,059 | B2 | * | 1/2011 | Rhodes et al. | 455/40 |
| 2006/0194537 | A1 | * | 8/2006 | McCoy | 455/40 |
| 2007/0135044 | A1 | * | 6/2007 | Rhodes et al. | 455/40 |

OTHER PUBLICATIONS

E. M. Sozer, et al., "Underwater Acoustic Networks", IEEE Journal of Oceanic Engineering, vol. 25, No. 1, Jan. 2000, p. 72-83.
S. M. Alamouti, "A Simple Transmit Diversity Technique for Wireless Communications", IEEE Journal on Select Areas in Communications, vol. 16, No. 8, Oct. 1998, p. 1451-1458.

* cited by examiner

*Primary Examiner* — Peguy Jean Pierre

(57) ABSTRACT

Disclosed is a communication network system, which includes a cluster and a base station. The cluster includes plural communication devices installed underwater and a wired connection connecting at least two of the plural communication devices. The base station performs acoustic communication with at least one of the plural communication devices.

37 Claims, 12 Drawing Sheets

COMMUNICATION NETWORK SYSTEM AND COMMUNICATION METHOD THEREOF

This application is based upon and claims the benefit of priority from Japanese Patent Application No. 2008-108494, filed on Apr. 18, 2008, the disclosure of which is incorporated herein in its entirety by reference.

TECHNICAL FIELD

The present invention relates to a communication network system and a communication method including plural communication devices and a base station.

BACKGROUND ART

Sozer, E. M., Stojanovic, M., and Proakis, J. G., "Underwater acoustic networks", IEEE Journal of Oceanic Engineering, Vol. 25, No. 1, January 2000, 72-83 (hereinafter, abbreviated as Sozer) discloses an underwater communication network system, which includes plural underwater acoustic communication devices and a base station. FIG. 10 shows an example of a schematic configuration of the underwater communication network system. The underwater communication network system in FIG. 10 includes underwater acoustic communication devices (hereinafter, referred to as underwater terminals) T11 and T12 installed in the sea 10 or at bottom of the sea, and a base station B11 connected to a backbone network 20 installed in the sea 10. An acoustic communication method is adopted to data communication between the underwater terminals T11 and T12, between the underwater terminal T11 and the base station B11, and between the underwater terminal T12 and the base station B11.

A wired underwater communication system is also known. FIG. 11 shows an example of the wired underwater communication system, where all underwater terminals T21 and T22 are connected to a base station B21 through cables 11 and 12, respectively.

SUMMARY

An object of the present invention is to provide a communication network system and a communication method thereof, which improve transmission rate and communication quality, and can remove restriction on installation location.

A communication network system, according to an exemplary aspect of the invention, includes: a cluster including plural communication devices installed underwater and a wired connection connecting at least two of the plural communication devices; and a base station which performs acoustic communication with at least one of the plural communication devices.

A communication method, according to an exemplary aspect of the invention, for controlling communication between plural communication devices and a base station, the communication devices and the base station being installed underwater, includes: performing wired communication between at least two of the plural communication devices; and performing acoustic communication between at least one of the plural communication devices and the base station.

A communication device, according to an exemplary aspect of the invention, installed underwater and connected wiredly to another communication device and performing acoustic communication with a base station, includes: a terminal transmission unit, which sends information to the another communication device; and a terminal sending and receiving unit, which sends information to the base station.

A relay device, according to an exemplary aspect of the invention, is wiredly connected to a first communication device and a second communication device and performing acoustic communication with a base station, the first and second communication devices and the base station being installed underwater, the first and second communication devices and the relay device forming a cluster. The relay device includes a relay device control unit, which controls at least one of the first and second communication devices, based on information from the controlled communication device.

A recording medium, according to an exemplary aspect of the invention, records a program, which makes a computer execute a process to control communication between plural communication devices and a base station, the communication devices and the base station being installed underwater. The process includes: a step for performing wired communication between at least two of the plural communication devices; and a step for performing acoustic communication between at least one of the plural communication devices and the base station.

BRIEF DESCRIPTION OF THE DRAWINGS

Exemplary features and advantages of the present invention will become apparent from the following detailed description when taken with the accompanying drawings, in which.

EXEMPLARY EMBODIMENT

A First Exemplary Embodiment

The exemplary embodiment will be described in detail in the following with reference to a drawing.

Figure 1:
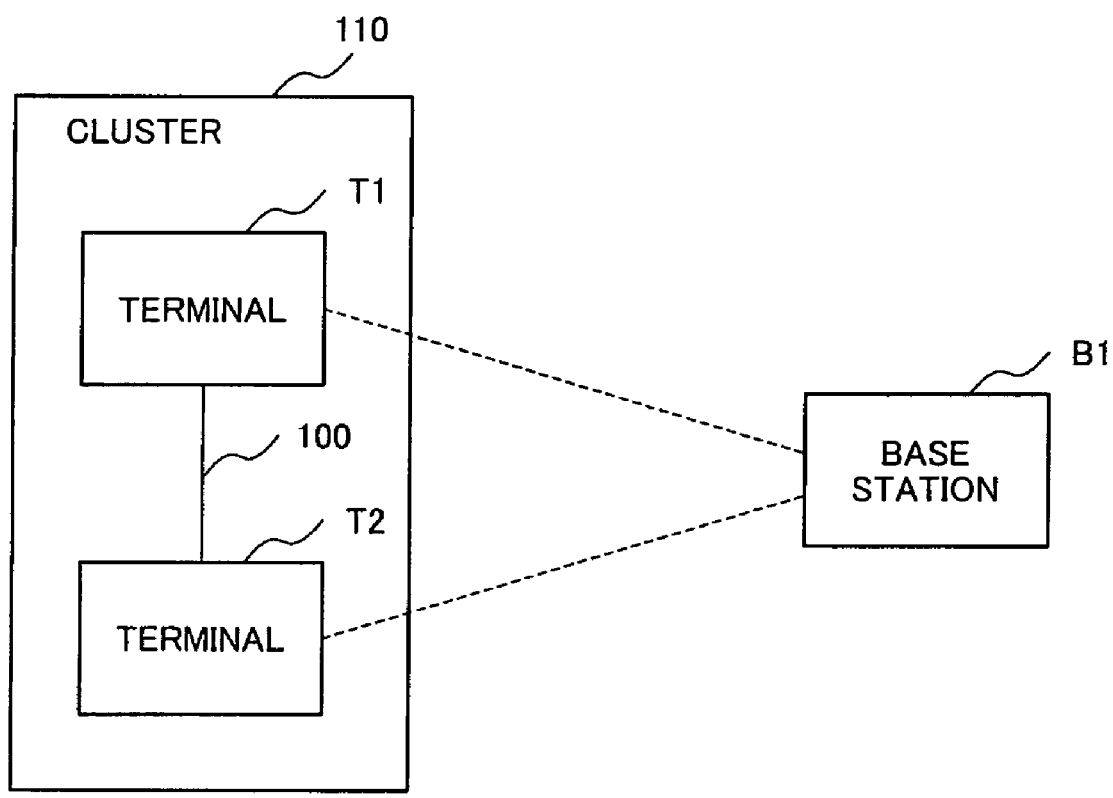
FIG. 1 is a block diagram showing an example of an underwater communication network system according to a first exemplary embodiment.

FIG. 1 shows a communication network system according to the first exemplary embodiment. The communication network system includes a base station B1, and two communication terminals T1 and T2. The first terminal T1 and the second terminal T2 are connected with each other through a cable 100, to form a cluster 110. Data transmission between each of all terminals not illustrated in FIG. 1 and the base station is performed according to a communication method using a signal having a common carrier frequency. On the other hand, the terminals T1 performs wired data transmission to the terminal T2 through the cable 100. Compared with the underwater communication network system shown in FIG. 10, the communication network system of the exemplary embodiment has a feature that the terminals T1 and T2 are connected with each other through the cable 100.

According to the exemplary embodiment, since the terminals T1 and T2 are wiredly connected, transmission rate and communication quality in the network system can be improved and communication procedure between the terminal T1 and the terminal T2 can be simplified.

According to the exemplary embodiment, the terminals T1 and T2 are wiredly connected with each other through the cable 100, but the terminals T1 and T2 are not wiredly connected to the base station B1 through a cable. Accordingly, restriction on installation location becomes small, compared with the all-wired network.

A Second Exemplary Embodiment

Figure 2:
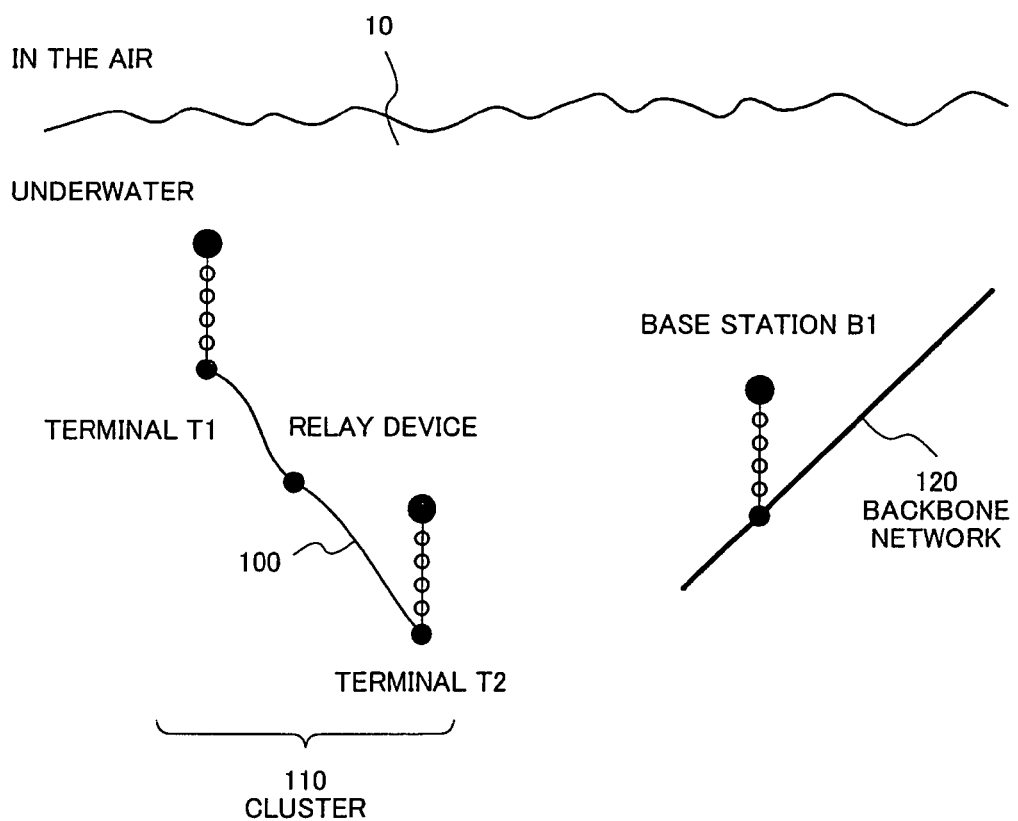
FIG. 2 shows an example of an underwater communication network system according to a second exemplary embodiment.
Figure 10:
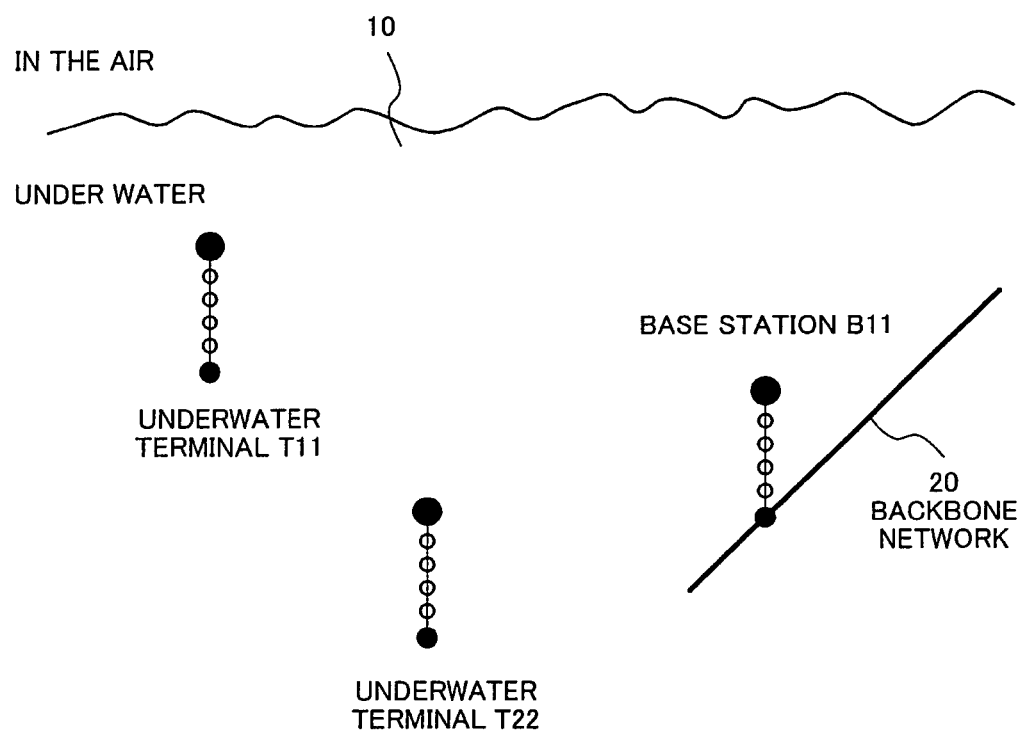
FIG. 10 shows a configuration of an underwater communication network system according to a related art.

FIG. 2 shows an underwater communication network system according to the second exemplary embodiment. The underwater communication network system includes a base station B1 connected to a backbone network 120 in the sea 10, two underwater acoustic communication terminals (henceforth, referred to as a terminal) T1 and T2, and a relay device C1. These devices are installed in the sea 10. The first terminal T1, the second terminal T2, and the relay device C1 are connected with each other through a communication cable 100, to form a cluster 110. Data transmission between each of all the other terminals not illustrated in FIG. 2 and the base station is performed according to the acoustic communication method using an acoustic wave having a common carrier frequency. Wired data transmission is performed between the terminals T1 and T2 through the cable 100. Difference from the underwater communication network system shown in FIG. 10 is that the terminals T1 and T2 are connected with each other through the cable 100 via the relay device C1.

Figure 3:
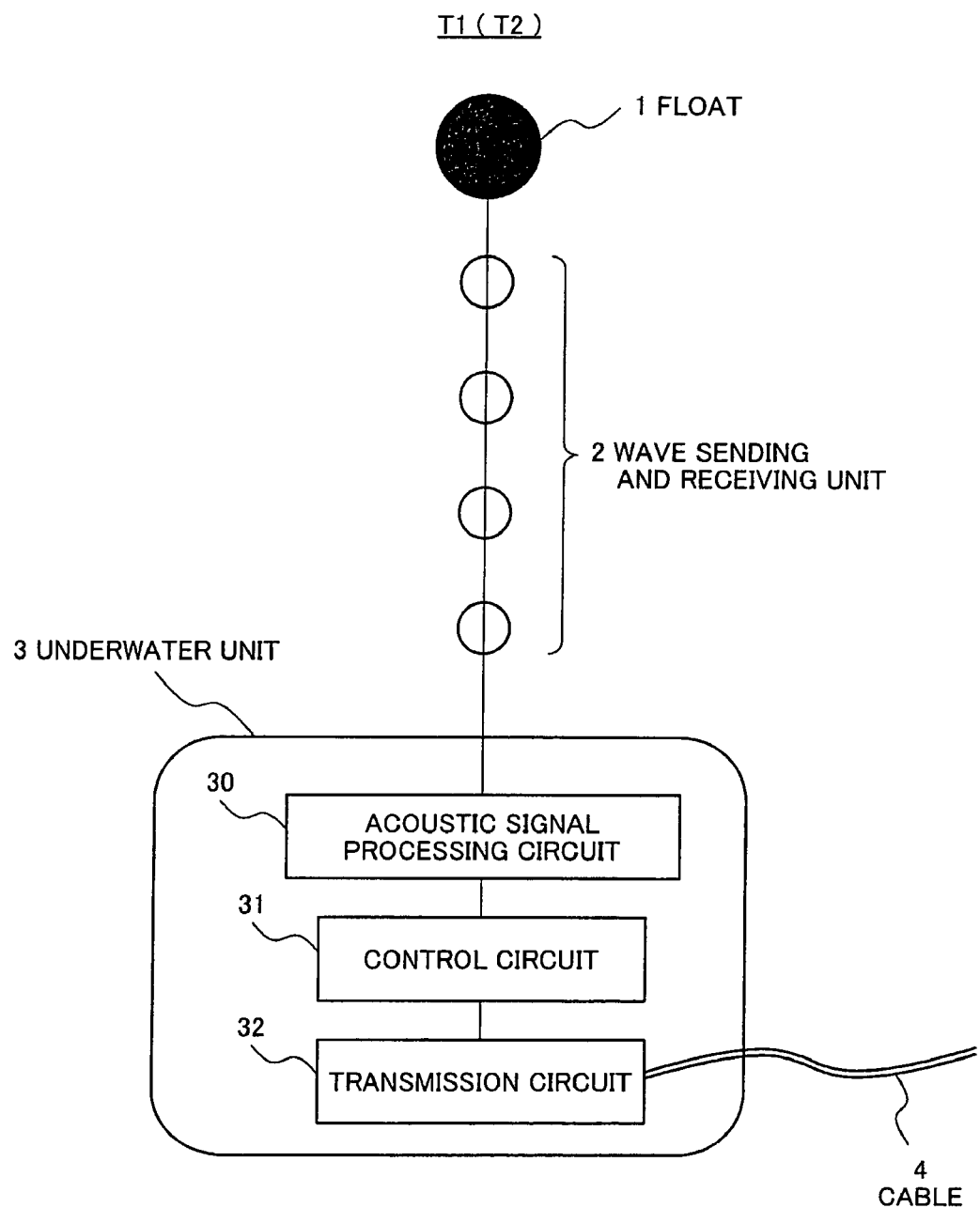
FIG. 3 shows an example of an underwater terminal according to the exemplary embodiment.

FIG. 3 shows an example of the terminal T1 or T2 according to the exemplary embodiment. As shown in FIG. 3, the terminal T1 (T2 has a similar configuration to T1) includes: a float 1 for extending an acoustic wave sending unit and an acoustic wave receiving unit vertically; an acoustic wave sending and receiving unit 2 (terminal sending and receiving unit) for sending and receiving an acoustic signal; an underwater unit 3 having an electronic circuit; and a cable 4 for communicating with the other terminal T2 (T1) within the cluster 110. The cable 4 corresponds to the cable 100 shown in FIG. 2.

The underwater unit 3 includes: an acoustic signal processing circuit 30 (terminal signal processing unit), which demodulates an acoustic signal received at the acoustic wave sending and receiving unit 2 and outputs a modulated signal to the acoustic wave sending and receiving unit 2; a transmission circuit 32 (terminal transmission unit), which processes data sent or received via the cable 4; and a control circuit 31 (terminal control unit), which controls sending and receiving operations of the acoustic wave sending and receiving unit 2 based on information provided by the transmission circuit 32.

Figure 4:
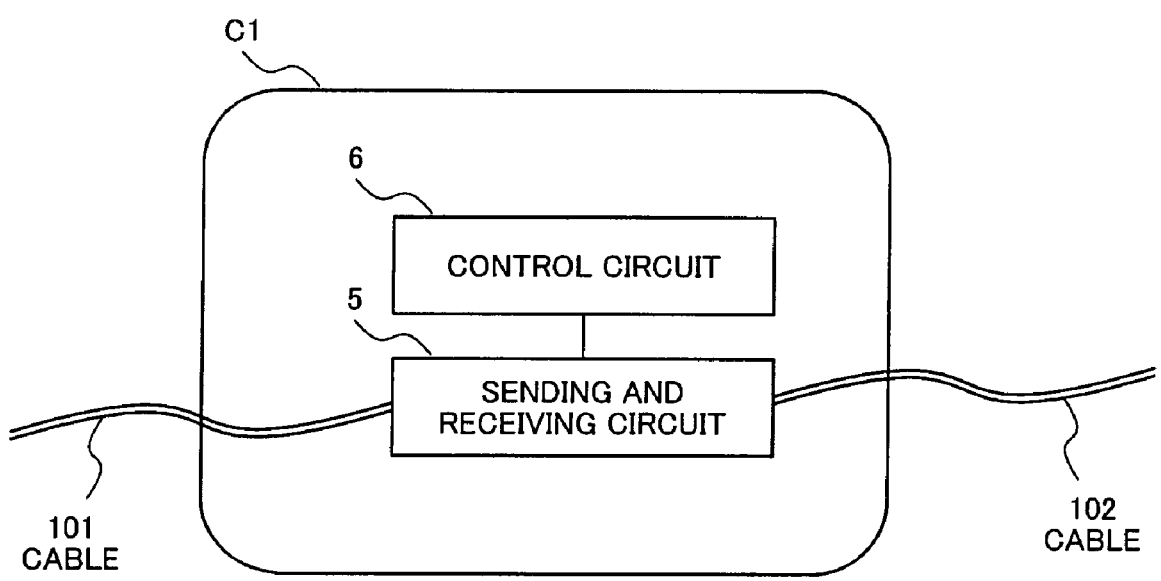
FIG. 4 shows an example of a relay device according to the exemplary embodiment.

FIG. 4 shows an example of the relay device C1 according to the exemplary embodiment. The relay device C1 shown in FIG. 4 includes a sending and receiving circuit 5 (relay device transmission unit) and a control circuit 6 (relay device control unit). The sending and receiving circuit 5 is connected to a terminal (for example, T1 in FIG. 2) via a cable 101. The sending and receiving circuit 5 is further connected to another terminal (for example, T2 in FIG. 2) via a cable 102. The sending and receiving circuit 5 sends/receives data to/from the terminals via the cables 101 and 102. The cable 101 or 102 corresponds to the cable 100 in FIG. 2 and to the cable 4 in FIG. 3. The control circuit 6 generates a control signal, based on data received by the sending and receiving circuit 5, and outputs the generated control signal to the sending and receiving circuit 5.

Figure 5:
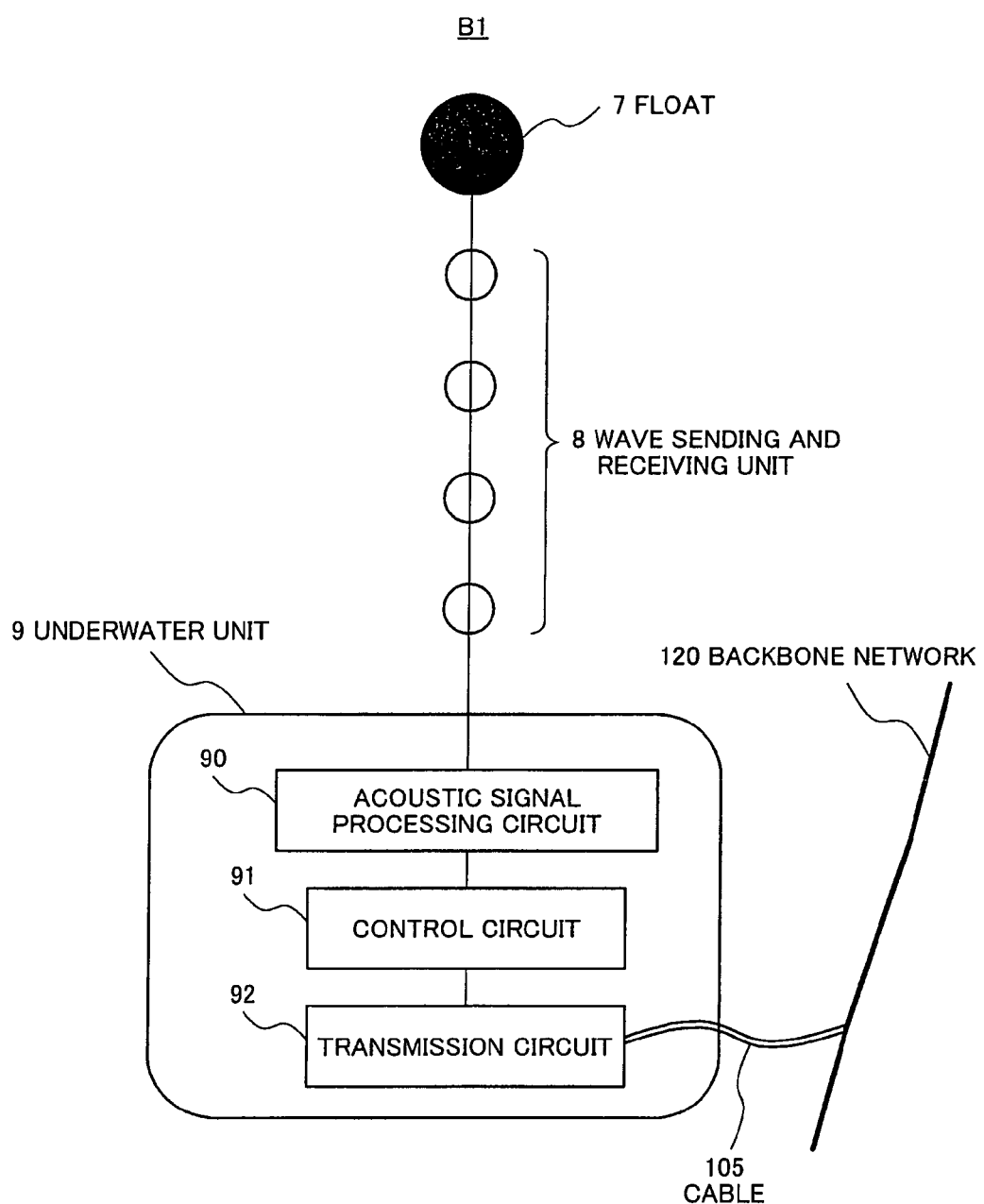
FIG. 5 shows an example of a base station according to the exemplary embodiment.

FIG. 5 shows an example of the base station B1 according to the exemplary embodiment. The base station B1 shown in FIG. 5 includes: a float 7 for extending an acoustic wave sending unit and an acoustic wave receiving unit vertically; an acoustic wave sending and receiving unit 8 (base station sending and receiving unit), which sends and receives an acoustic wave signal; an underwater unit 9 having an electronic circuit; and a cable 105, which is connected to the backbone network 120. The base station B1 has a similar configuration to the terminal T1 or T2. The underwater unit 9 includes: an acoustic signal processing circuit 90 (base station signal processing unit), which demodulates an acoustic signal received by the acoustic wave sending and receiving unit 8 and outputs a modulated signal to the acoustic wave sending and receiving unit 8; a transmission circuit 92, which processes data sent or received via the cable 105; and a control circuit 91 (base station control unit), which controls sending and receiving operations of the acoustic wave sending and receiving unit 8, based on information provided by the transmission circuit 92.

Next, an example of operation of the underwater communication network system according to the exemplary embodiment will be described as follows:

First, a communication procedure for sending data from the terminal T1 to the base station B1 will be described with reference to FIG. 6.

A sensing unit (not illustrated) provided in the underwater communication network system detects an event occurs in the sea, and generates data. When the sensing unit generates data, the terminal T1 sends wave carrying a call signal to the base station B1 (step SC1). Henceforth, sending wave and receiving wave mean sending an acoustic signal and receiving an acoustic signal, respectively, by an acoustic wave sending and receiving unit (shown in FIG. 3 as the acoustic wave sending and receiving unit 2 of the terminals T1 and T2, and shown in FIG. 5 as the acoustic wave sending and receiving unit 8 of the base station B1). When the base station B1 receives the wave carrying the call signal (step SC9), the base station B1 sends back an acknowledgment signal (ACK) to the call signal sending terminal T1 (step SC10). After the terminal T1 shown in FIG. 3 sends the call signal, the control circuit 31 of terminal T1 waits for the ACK signal for a predetermined time (step SC2). When the terminal T1 receives the ACK signal within the predetermined time, the terminal T1 establishes a link to the base station B1 (step SC3). The base station B1 also establishes a link to the terminal T1 (step SC11). Afterward, the terminal T1 and the base station B1 perform an acoustic communication with each other. On the other hand, when the predetermined time has lapsed before the terminal T1 receives the ACK signal in step SC2, the link in step SC11 fails to be established.

In case that the terminal T1 does not receive the ACK signal within the predetermined time, the terminal T1 sends data to be sent to the base station B1, to the terminal T2 connected to the terminal T1 through the cable using the wired communication method (step SC4). That is, data transmission is performed through an operation of sending and receiving signal by the transmission unit (shown in FIG. 3 as the transmission circuit 32 of the terminals T1 and T2, and shown in FIG. 4 as the sending and receiving circuit 5 of the relay device C1). When the terminal T2 receives data from the terminal T1 through the cable via the relay device C1 (step SC5), the terminal T2 sends acoustic wave carrying the call signal to the base station B1 (step SC6).

In case that the base station B1 receives the wave carrying the call signal (step SC12), the base station B1 sends back wave carrying the ACK signal to the call signal sending terminal T2 (step SC13). The control circuit 31 of terminal T2 monitors whether the terminal T2 receives the wave carrying the ACK signal within a predetermined time, after sending the wave carrying the call signal (step SC7). In case that the terminal T2 receives the wave carrying the ACK signal within the predetermined time, the terminal T2 establishes a link to the base station B1 (step SC8). The base station B1 also establishes a link to the terminal T2 (step SC14). Afterward, the terminal T2 and the base station B1 can perform the acoustic communication with each other.

Further, in case that the terminal T2 does not receive the wave carrying the ACK signal from the base station B1 within the predetermined time in step SC7, it is judged that both the terminals T1 and T2 cannot communicate with the base station B1. As a result, data to be sent from T1 to the base station is not sent to the base station B1. According to the exemplary embodiment, installation location of the cluster 110 is selected so as not to be caused the above mentioned problem.

Figure 6:
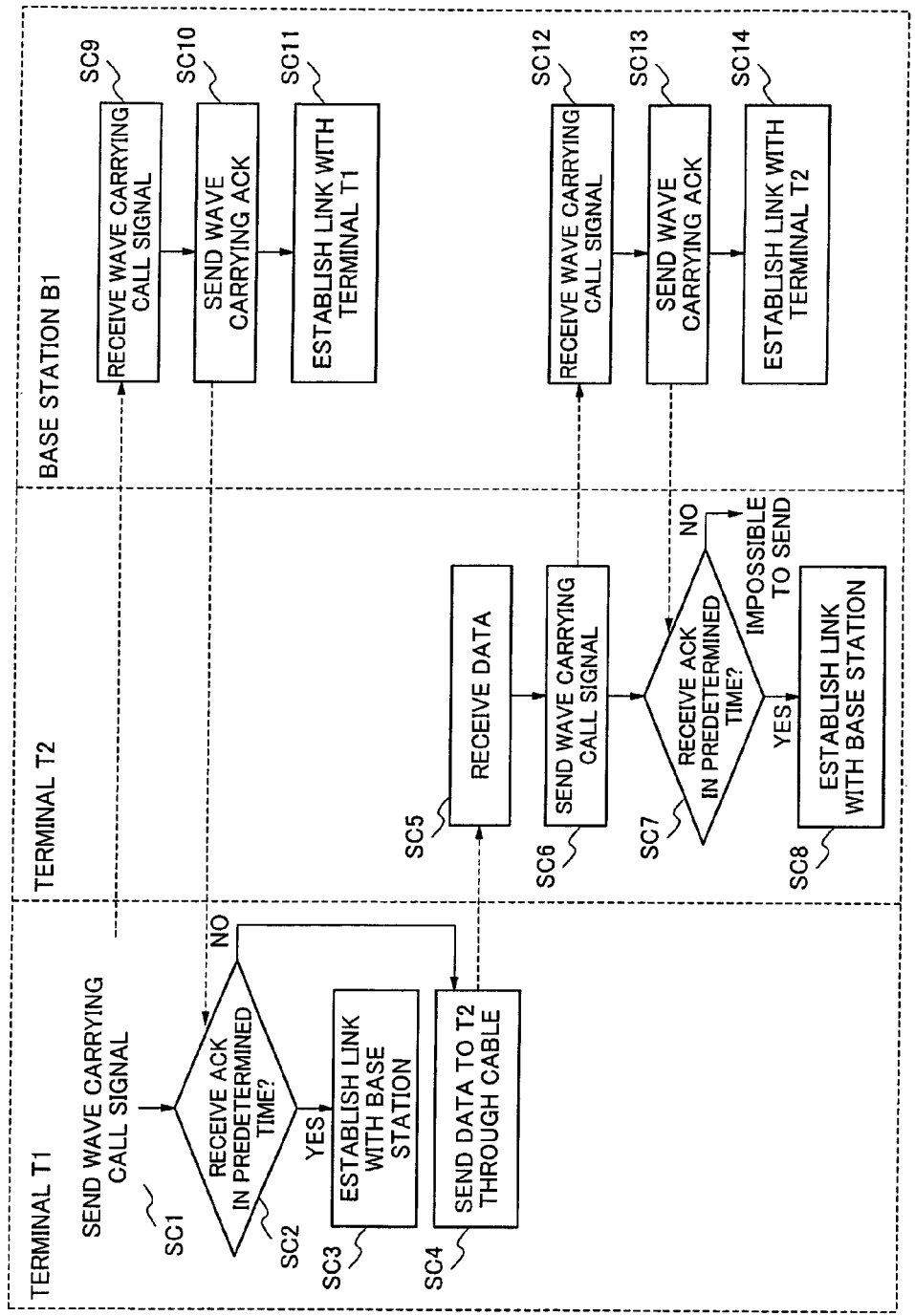
FIG. 6 is a flowchart showing an example of operation of the network system according to the second exemplary embodiment.

The underwater communication network system shown in FIG. 10 has a function only to perform operations of SC1 to SC3 and SC9 to SC11 in FIG. 6. For this reason, in case that the terminal T11 and the base station B11 in FIG. 10 cannot communicate through an acoustic signal, the terminal T11 becomes isolated from the underwater communication network system. According to the exemplary embodiment, the terminal T1 can communicate with the base station B1, if any one of the terminal T1 and the terminal T2 can perform the acoustic communication with the base station B1.

According to the multi-hop acoustic communication method, disclosed by Sozer, data is transmitted between the terminal T1 and the terminal T2 by the acoustic communication. However, according to the acoustic multi-hop communication method, transmission rate and communication quality are generally low. For this reason, the acoustic multi-hop communication has problems that the communication unit needs a complicated structure, and data transmission needs quite a long time. In contrast to the underwater communication network system in FIG. 10, according to the exemplary embodiment, the transmission time becomes shorter in the underwater communication network system and the transmission quality is improved, and the communication procedure becomes simple, by wiredly connecting the terminals T1 and T2.

According to the above mentioned data communication procedure shown in FIG. 6, the relay device C1 transfers data from the terminal T1 to the terminal T2. In this case, the relay device C1 may be omitted.

Next, a communication procedure taking account of quality of a propagation path between the terminals T1 and T2 in the communication procedure shown in FIG. 6 will be described with reference to FIG. 7.

The base station B1 sends wave carrying a probe signal to the terminals T1 and T2 (step SC21). In case that the terminals T1 and T2 receives the wave carrying the probe signal (step SC33 and SC26), the terminals T1 and T2 send necessary information to the relay device C1 via the cable 4 (101,102). The control circuit 6 of the relay device C1 uses the necessary information to select one of the terminals T1 and T2, which performs the acoustic communication with the base station B1. The necessary information includes the following information:

1. a reception level of wave at the terminal;
2. a reception time of wave, from which time delay for acoustic wave propagation is obtained; and
3. environment of propagation path between the terminal and the base station.

The control circuit 6 of the relay device C1 selects a terminal to perform the acoustic communication with the base station B1, based on the received necessary information, and generates control information (step SC35). For example, there are three criteria for selecting the terminal to perform the acoustic communication with the base station:

1. Selecting a terminal, which has higher reception level of wave than the other terminal;
2. Selecting a terminal, which receives the wave earlier than the other terminal; and
3. Selecting a terminal, which connects to the base station via a propagation path having a better environment than the other propagation path.

The relay device C1 sends the generated control information to the terminal selected from the terminals T1 and T2, via the cable 101 and 102. Assume, here, that the terminal T2 is selected to be a terminal to perform the acoustic communication with the base station B1. In this case, the relay device C1 sends the generated control information to the terminal T2 via the cable 102 (step SC36).

In case that the terminal T2 receives the control information from the relay device C1 (step SC28), the terminal T2 estimates position of the base station B1, based on the probe signal sent from the base station B1, and turns directivity of the sending and receiving unit 2 toward the base station B1 (step SC29). However, the step SC29 may be omitted. Next, the terminal T2 sends wave carrying a first ACK signal (ACK1) to the base station B1 (step SC30).

In case that the base station B1 receives the wave carrying ACK1 (step SC22), the base station B1 turns directivity of the sending and receiving unit 8 toward the terminal T2, based on the received wave carrying ACK1 (step SC23). However, the step SC23 may be omitted. Next, the base station B1 sends wave carrying a second ACK signal (ACK2) indicating that the base station B1 receives the ACK signal sent by the terminal T2, to the terminal T2 which sent ACK1 (step SC24).

In case that the terminal T2 receives the wave carrying ACK2 (step SC31), the terminal T2 establishes a link to the base station B1 (step SC32). Then, the base station B1 also establishes a link to the terminal T2 (step SC25). Afterward, information generated in the terminal T1, is sent to the terminal T2 via the cable, and the terminal T2 sends wave carrying the information to the base station B1 by the acoustic communication.

Figure 7:
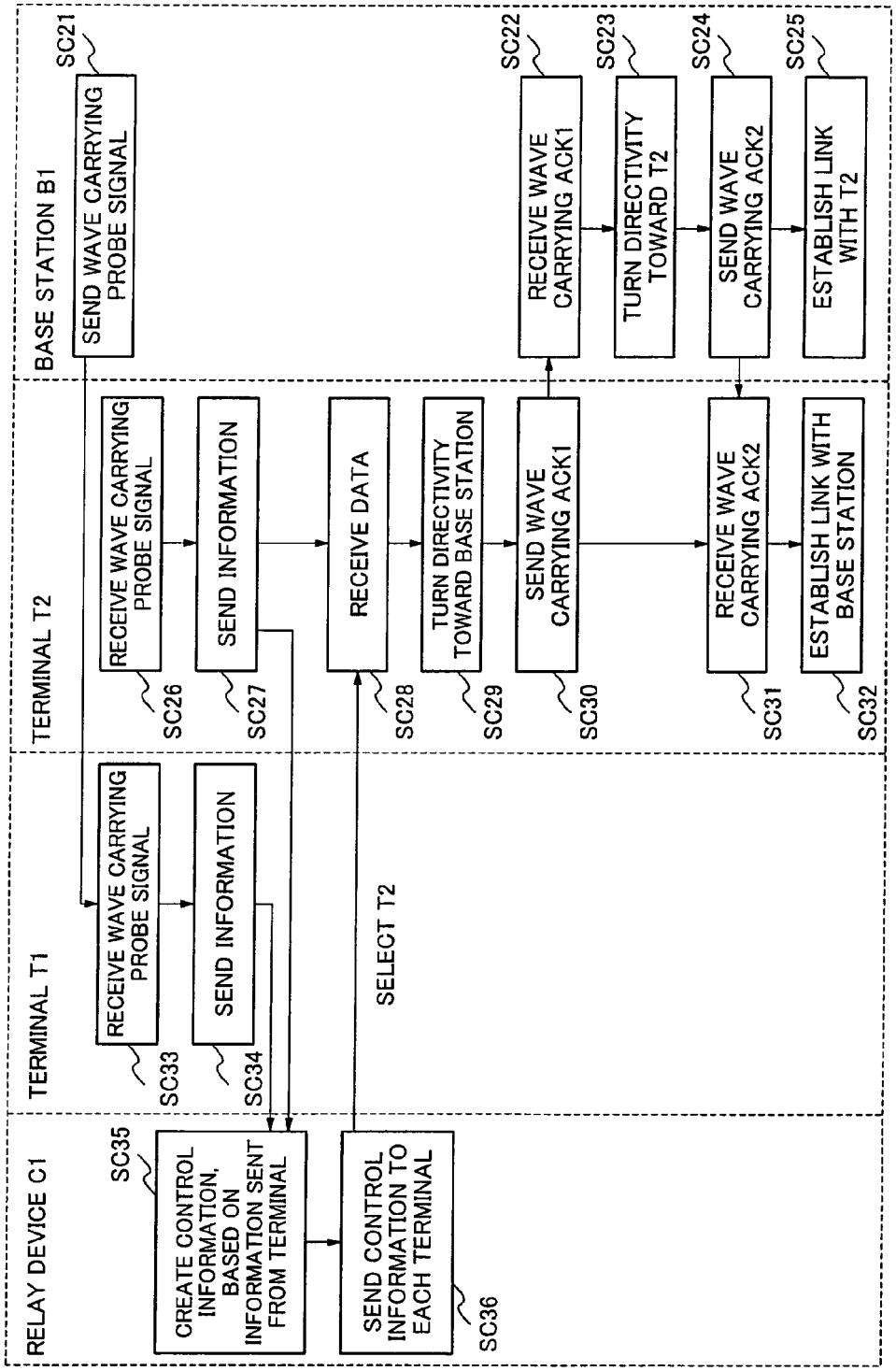
FIG. 7 is a flowchart showing an example of operation of the network system according to the second exemplary embodiment.

Each process of the steps shown in FIGS. 6 and 7 is performed under control by the control circuits 31 of the terminals T1 and T2 and by the control circuit 91 of the base station B1. Thus, according to the exemplary embodiment, by the communication procedure shown in FIG. 7, the communication path with better communication quality is selected from the communication path between the base station B1 and the terminal T1 and the communication path between the base station B1 and the terminal T2. For this reason, stable quality of transmission for the underwater acoustic communication is maintained, while the propagation environment is unstable in the sea. According to the exemplary embodiment, fluctuation of the network quality, which depends on the terminals can be reduced, since the communication quality in the cluster, in which the terminals T1 and T2 are wiredly connected, is considerably higher than that of the acoustic communication.

Furthermore, according to the exemplary embodiment, restriction on terminal installation location can be eased. Meanwhile, the terminals T1 and T2 are connected each other through the cables 101 and 102 (100) via the relay device C1, however the connection between the terminal T1 and the base station B1 and the connection between the terminal T2 and the base station B1 are not via cables. For this reason, the terminal installation location is less restricted compared with the all-wired network.

Figure 8:
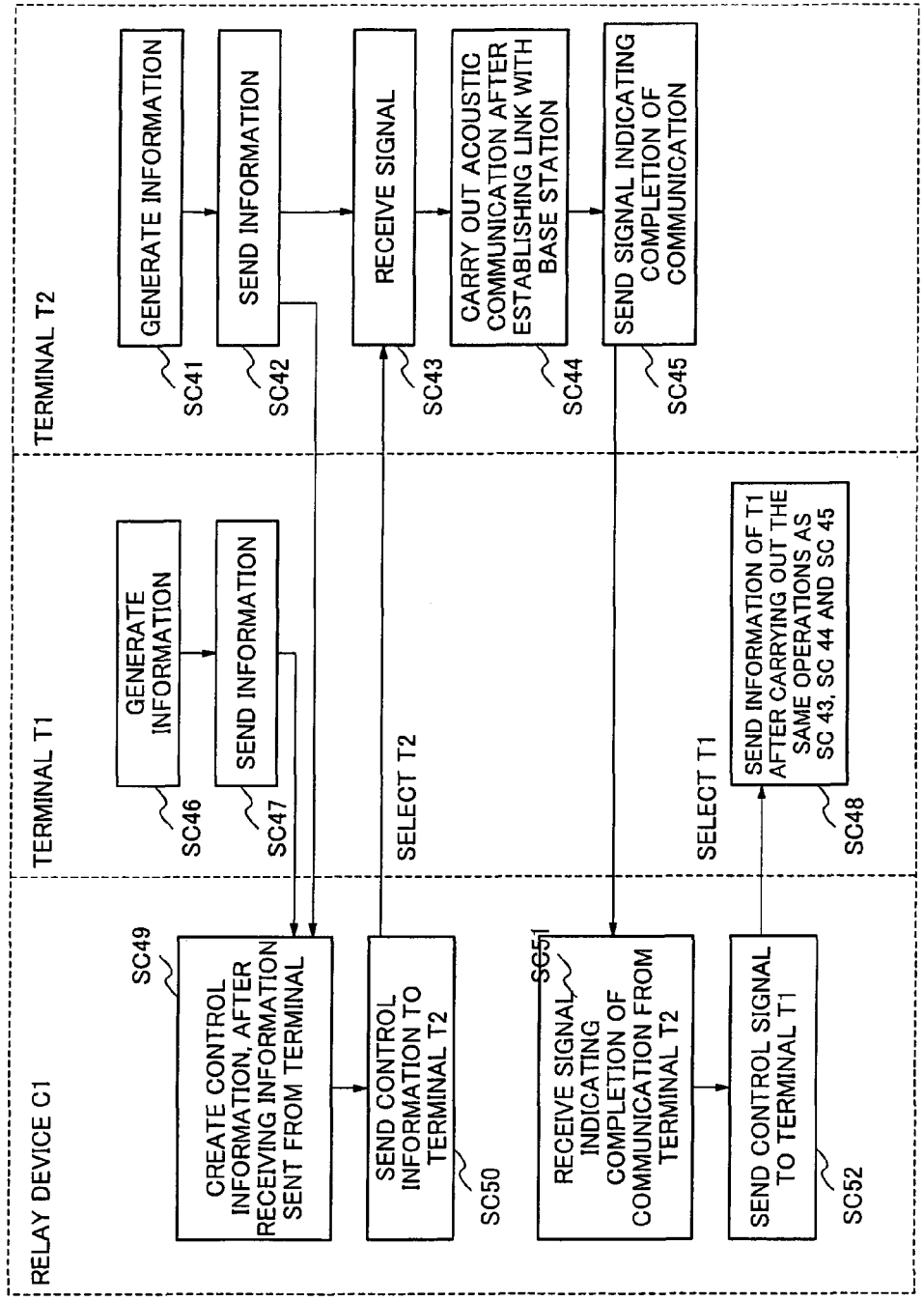
FIG. 8 is a flowchart showing an example of operation of the network system according to the second exemplary embodiment.

Next, a communication procedure in case that information to be sent to the base station B1 is generated simultaneously both at the terminal T1 and at the terminal T2 will be described as follows with reference to FIG. 8.

Assume that information to be sent to the base station B1 are generated simultaneously both at the terminal T1 and at the terminal T2 (step SC46 and SC41). Here, simultaneous generation does not mean that data is generated both at the terminal T1 and at the terminal T2 simultaneously, but means that while one terminal of T1 and T2 is sending acoustic wave carrying information from the terminal, the other terminal of T1 and T2 begins to send acoustic wave carrying information from the other terminal. In the underwater communication network system shown in FIG. 10, as explained with reference to FIG. 12, the carrier frequency of sending wave of the underwater terminal T11 is the same as that of the underwater terminal T12. During a sending wave period by the underwater terminal T11 and a sending wave period by the underwater terminal T12 overlap, the sending waves by T11 and T12 are interfere with each other, and received wave at the base station may not be demodulated. A communication procedure shown in FIG. 8 avoids such interference.

The terminals T1 and T2 send a notification indicating sending wave carrying information, to the relay device C1 through the cable (step SC47 and SC42). This notification is received by the relay device C1 through the cable (step SC49). The control circuit 6 of the relay device C1 selects a terminal from the two terminals T1 and T2, which sends wave first, based on the received notification. The terminal is selected taking account of the following criteria, for example:

1. Propagation quality of the path between the terminal T1 and the base station B1 and the path between the terminal T2 and the base station B1 (reception level of wave, time delay for wave propagation, or the like);
2. Degree of urgency of the information; and
3. Amount of the information to be sent.

Specifically, there are three bases for selecting the terminal to send wave first:

1. Selecting a terminal having better propagation quality to the base station B1;
2. Selecting a terminal sending wave carrying information having higher degree of urgency; and
3. Selecting a terminal sending wave carrying a smaller amount of sending information.

Assume, here, that the control circuit 6 of the relay device C1 selects the terminal T2 as a terminal to send wave first. The relay device C1 sends control information to the terminal T2 (step SC50). When the terminal T2 receives the control information from the relay device C1 through the cable (step SC43), the terminal T2 establishes a link to the base station B1 and begins the acoustic communication with the base station B1 (step SC44). When the acoustic communication between the terminal T2 and the base station B1 finishes, the terminal T2 sends a communication completion signal indicating completion of communication, to the relay device C1 through the cable (step SC45).

In case that the relay device C1 receives the communication completion signal (step SC51), the relay device C1 sends control information to the terminal T1 through the cable in order to begin the acoustic communication between the terminal T1 and the base station B1 (step SC52). After the terminal T1 receives the control information from the relay device C1, the terminal T1 performs the same processing at the steps SC43, SC44 and SC45, which the terminal T2 performed, and finishes the acoustic communication between the terminal T1 and the base station B1 (step SC48).

According to the exemplary embodiment as above, in case that information is generated simultaneously at the terminal T1 and at the terminal T2, the control circuit 6 of the relay device C1 controls the terminal T1 and the terminal T2 to perform the acoustic communication with the base station B1, in the order from T1 or from T2. For this reason, the problem that acoustic waves sent simultaneously by the plural terminals T1 and T2 interfere with each other can be avoided. Furthermore, according to the exemplary embodiment, wave carrying urgent information can be preferentially sent, since the relay device C1 determines an order of sending wave also taking account of degree of urgency of information.

According to the exemplary embodiment, the terminal T1 and the terminal T2 are connected to each other through the cable via the relay device C1. The relay device C1 receives the communication completion signal indicating completion of the acoustic communication between one terminal and the base station through the cable. The relay device, then, instructs to start the acoustic communication between the other terminal and the base station. Accordingly, the problem that an invisible terminal exists, which has been described with reference to FIG. 13, may not occur.

A Third Exemplary Embodiment

Next, the third exemplary embodiment will be described in the following with reference to FIG. 2.

According to the exemplary embodiment, since the terminal T1 and the terminal T2 are connected with each other through the cable via the relay device C1, the sending time to send wave from the terminal T1 and the sending time from the terminal T2 can be adjusted, respectively. Accordingly, the transmit diversity method can be applied to the network system, in order to improve the acoustic communication quality. Here, a communication procedure where the transmit diversity method is applied to the network system according to the exemplary embodiment will be described in the following with reference to FIG. 9. In the data transmission according to the transmit diversity method, different carrier signals are allocated to the terminals T1 and T2, respectively.

According to the transmit diversity method, not less than 2 acoustic communication paths (in this case, transmission paths from the terminals T1 to the base station B1 and from the terminals T2 to the base station B1) are used for sending information. The method can bring a significant effect on improving communication quality, if the wave signals sent through the plural acoustic communication paths reach the base station at the same time. On the other hand, if time delays of the wave signals sent through the acoustic communication paths are different from each other, the wave signals arrive at different times from each other, then the effect expected by using the transmit diversity method becomes degraded significantly. However, according to the exemplary embodiment, two terminals T1 and T2 are connected each other through the cable via the relay device. Accordingly, the relay device C1 can adjust easily a time difference between sending times of the terminal T1 and of the terminal T2. Moreover, the terminal T1 and the terminal T2 share the information through the relay device C1. Accordingly, the transmit diversity method can be applied to the underwater acoustic communication.

Figure 9:
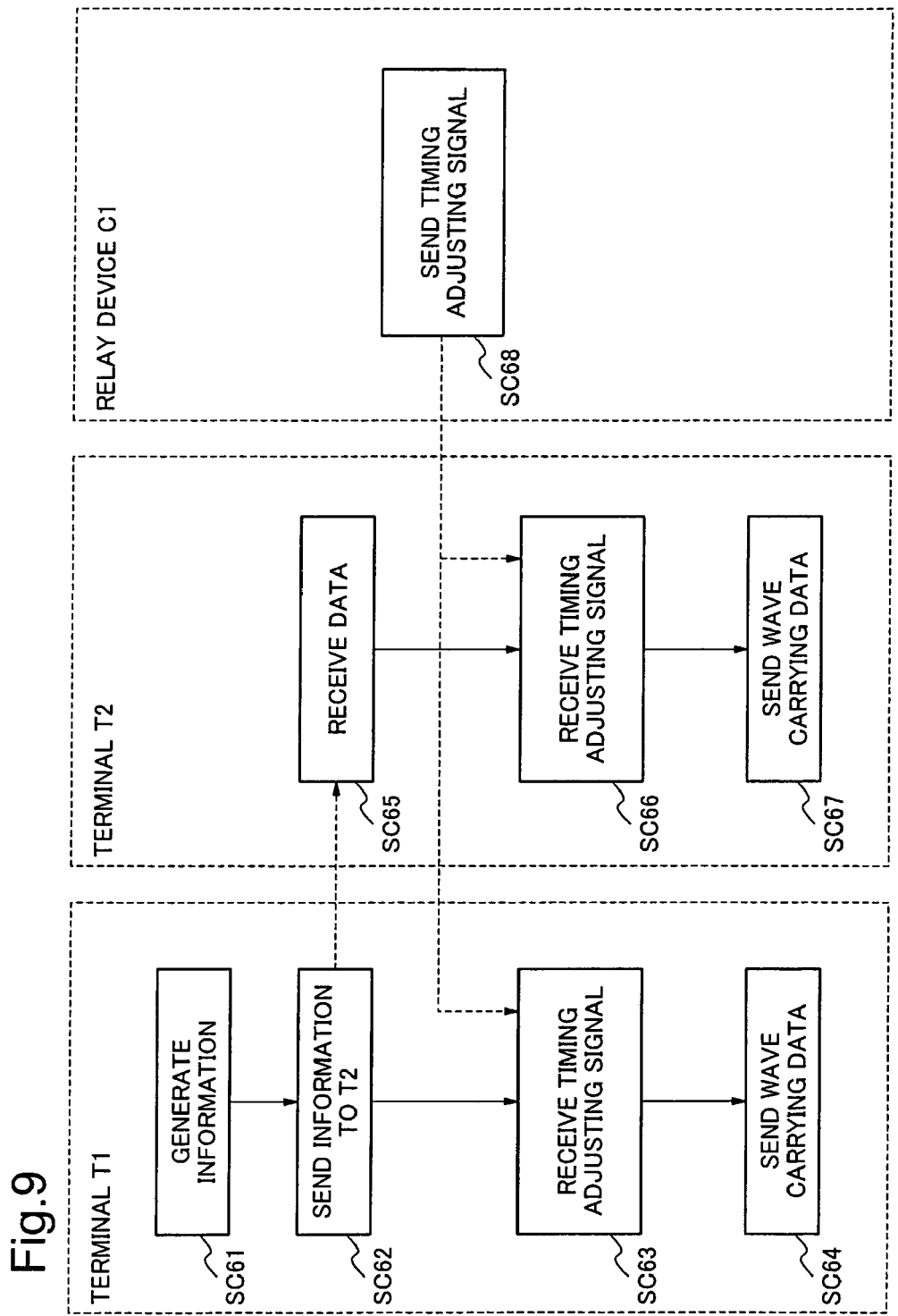
FIG. 9 is a flowchart showing an example of operation of a network system according to a third exemplary embodiment.

An operation of the transmit diversity method applied to the underwater acoustic communication according to the exemplary embodiment, will be described in the following with reference to FIG. 9. First, assume that information to be sent to the base station B1 is generated in the terminal T1 (step SC61). The terminal T1 transfers the information to the terminal T2 through the cable via the relay device C1 (step SC62). The terminal T2 receives the transferred information (step SC65). The relay device C1 determines wave sending time (sending timing adjusted time) at each of the terminals T1 and T2, based on the reception times of wave, on which probe signal issued from the base station arrive at the terminals T1 and T2. The reception times of wave are notified the terminals T1 and T2 previously. The wave sending times are adjusted so that the base station may receive the sending waves from the terminals T1 and T2 at the same time. The relay device C1 sends a timing adjusting signal to each of the terminals T1 and T2 through the cable (step SC68). Each of the terminals T1 and T2 receives the timing adjusting signal (step SC63 and step SC66). The terminals T1 and T2 send waves carrying the same information (information generated at the terminal T1) at the times adjusted for the terminals T1 and T2, respectively (step SC64 and step SC67).

A method for generating sending wave signal in each of terminals T1 and T2 and a method for demodulating in the base station B1 are in accordance with a transmit diversity method, which is described, for example, in a publicly known document (Alamouti Siavash M.; "A simple transmit diversity technique for wireless communications", IEEE Journal on Selected Areas in Communications, Volume 16, No. 8, October 1998, 1451-1458).

In the exemplary embodiment, sending information from the terminals T1 and T2 to the base station B1 is described. However, when the base station B1 sends information to the terminal T1 and T2, a receive diversity method, in which plural terminals are used, also can be applied, to improve the communication quality.

According to the exemplary embodiment, the transmit diversity method or the receive diversity method can be applied to the acoustic communication, in which plural terminals connected each other through cables, to improve communication quality of the underwater acoustic communication.

Next, an effect of each exemplary embodiment will be described, in comparison to the related art shown in FIG. 10.

Generally, it is difficult to improve the transmission rate of the undersea acoustic communication, since the propagation environment of the undersea acoustic communication is unstable, for example, the communication quality is low according to large propagation delay and too many multi-paths. Accordingly, in case that all the acoustic communications, i.e. between any two terminals of all the underwater terminals, in this case the two terminals T11 and T12, and between any one terminal of all the underwater terminals and the base station B11, in this case between T11 and B11 and between T12 and B11, are performed by the underwater communication, as shown in FIG. 10, the communication quality as an underwater communication system is low.

In contrast, the underwater communication system according to the first exemplary embodiment includes a cluster having plural communication terminals installed underwater and connected to each other through cables, and a base station, which performs acoustic communication with at least one communication terminal out of plural communication terminals. Accordingly, according to the exemplary embodiment, the transmission rate in the communication network system and the transmission quality can be improved, and the communication procedure between the terminal T1 and the terminal T2 can be simplified.

Since the underwater terminals T11 and T12 shown in FIG. 10 are installed on the bottom of the sea or in the sea, it is difficult to change the location of the underwater terminal. In case that once the acoustic communication between the underwater terminal and the base station B11 is cut off, the underwater terminal at the installation place becomes isolated from the network. Sozer discloses a multi-hop network to solve this problem. According to the multi-hop network, an underwater terminal, which can communicate with the base station and locates near another underwater terminal unable to perform communication with the base station (referred to as an isolated terminal), plays a role of a relay terminal for the isolated terminal. That is, information from the isolated terminal is transferred to the base station B11 by repeating the transfer processing at each of the underwater terminals.

In particular, since the underwater communication network system disclosed by Sozer uses the multi-hop communication, in which each underwater terminal has also a function of relaying, a communication state of each of the underwater terminals will easily influence the whole network. In the worst case, by a failure of any one of the underwater terminals, whole of the underwater communication network system may become nonfunctional. Furthermore, in case that one underwater terminal cannot communicate with any other underwater terminals of the underwater communication network system, the underwater terminal may be excluded from the network to be an isolated terminal.

That is, the underwater communication network system using the multi-hop communication method disclosed by Sozer has a problem that in case that one underwater terminal fails, one data transfer path is lost. That is, influence from one underwater terminal to the whole network is serious. In case that a data transfer path is lost, another data transfer path via other underwater terminal has to be prepared for the acoustic communication in the underwater communication network system using the multi-hop communication method. However, in general, underwater acoustic communication between the underwater terminals has low communication quality and low transmission bit rate. Furthermore, as the propagation environment of the acoustic signal is unstable, a substitutional data transfer path may not be found. The above mentioned underwater communication network system depending on the individual underwater terminal has a problem of the unstable transmission quality.

According to the second exemplary embodiment, the communication procedure shown in FIG. 6 is performed. That is, a first communication terminal included in the cluster detects a state of communication between the first communication terminal and the base station. In case that the first communication terminal judges the communication state satisfies a first condition, the first communication terminal sends information to the base station. Otherwise, a terminal transmission unit of the first communication terminal sends the information to a second communication terminal included in the cluster. The second communication terminal transfers the information to the base station. Accordingly, no terminal becomes isolated from the communication network system, and consequently, the transmission quality becomes stable.

Figure 12:
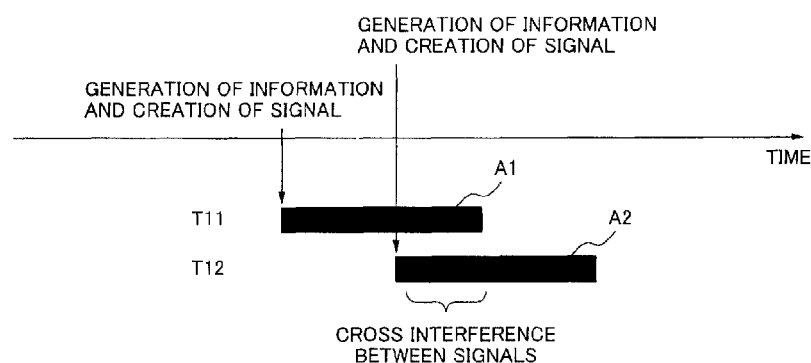
FIG. 12 is a diagram to explain a communication method according to the related art.

Moreover, the underwater communication network system shown in FIG. 10 has another problem caused by a state where the plural underwater terminals T11 and T12 send signals simultaneously. FIG. 12 shows a state where signals are generated in the underwater communication network system shown in FIG. 10. As shown FIG. 12, information is generated in the underwater terminal T11. The underwater terminal T11 immediately begins to transmit a signal carrying the information. The underwater terminal T11 transmits the information for a period A1. Under this situation, information is also generated in the underwater terminal T12. The underwater terminal T12 immediately begins to transmit a signal carrying the information. The underwater terminal T12 transmits the information for a period A2. In this case, these two periods overlap, where both of the underwater terminals T11 and T12 send signals simultaneously. Since the same frequency carrier is used for sending wave carrying information from both of underwater terminals T11 and T12, the transmitted waves interfere with each other during the overlapped period. The base station cannot demodulate the received wave.

Figure 13:
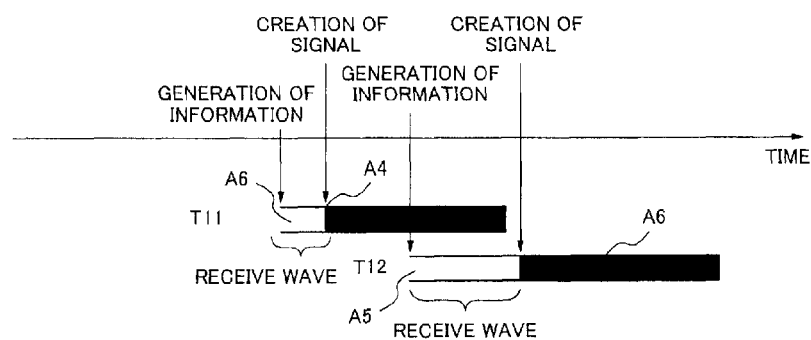
FIG. 13 is a diagram to explain another communication method according to the related art.

The related art adopts the following method to avoid the problem of the overlap of signals described above. In case that each sensing unit (not illustrated) of the terminals T11 and T12 generates information, each of the terminals T11 and T12 begins to detect wave. As shown in FIG. 13, the terminal T11 begins to detect wave at A3. If the terminal T11 does not receive wave from other terminal T12, the terminal T11 begins to send wave carrying signal at A4. The terminal T12, in which information is generated a short time later than the terminal T11, begins to detect wave. The terminal T12, which receives the wave sent from other terminal T11 in this case, does not send wave. Afterward, the terminal T12 continues to detect wave. When the terminal T12 does not receive wave sent from other terminal T11, which finishes sending wave, the terminal T12 begin to send wave at A6. In this way, overlap of signals can be avoided.

However, in the above case, it is assumed that the terminal T12 can receive wave sent from the terminal T11. However, when due to some trouble, such as a big rock existing between the terminals T11 and T12, propagation path is cut off (so-called invisible terminal problem), the above method does not work properly.

According to the exemplary embodiment, the base station sends a probe signal to the communication terminal, and the communication terminal generates receiving information, based on the received probe signal. Then, the second communication terminal, for example, is selected from the communication terminals included in the cluster, based on the receiving information. In case that the second communication terminal included in the cluster begins to send the second information to the base station during a period from when the first communication terminal included in the cluster begins to send the first information to the base station until when the first communication terminal finishes sending, a communication terminal to perform communication with the base station is selected from the first and the second communication terminals, based on the first information and the second information. Accordingly, the above-mentioned interference and invisible terminal problems can be avoided.

Furthermore, according to the transmit diversity method where information is sent through not less than 2 acoustic communication paths (in this case, path from the terminal T11 to the base station B11 and path from the terminal T12 to the base station B11), an effect of the method on improving communication quality is quite significant. However, the acoustic communication network system of FIG. 10 has three problems, which will be described in the following, to be solved in order to adopt the transmit diversity method using plural terminals.

The first problem is that even if propagation lengths from the terminals to the base station are the same, the sending times at the terminals must be synchronized. In this case, the sending time must be predetermined. Therefore, a flexibility of the system of FIG. 10 is quite small.

The second problem is that delays of propagation time for the acoustic signal through the underwater propagation paths are different from each other, due to intrinsically small acoustic propagation velocity and differences of length between the propagation paths. Assume that a difference of length for the propagation path from the terminal to the base station is 50 m, and the acoustic propagation velocity is 1500 m/s. Difference in the propagation delay time is about 33 ms. In case that data transmission rate is 1 kbps, i.e. a period for a bit is 1 ms, even if signals are sent simultaneously, difference in the arrival time at the base station comes to 33 bits in bit time. Due to the difference, the transmit diversity method brings a negative effect. Since it is quite difficult to solve the above problem for the underwater communication network system shown in FIG. 10, the transmit diversity method, which would improve transmission quality, cannot be applied to this system.

The third problem is that in case that information is generated in one terminal of the terminals T11 and T12, the other terminal must share the information in order to perform the communication according to the transmit diversity method. The acoustic communication, then, must be performed from the terminal, in which information is generated, to the other terminal. Accordingly, applying the transmit diversity method to the underwater communication network system, such as shown in FIG. 10, would have little effect.

According to the third exemplary embodiment, the base station sends a probe signal to the communication terminal, and the communication terminal generates receiving information, based on the received probe signal. A sending time when the communication terminal included in the cluster sends information is controlled, based on the receiving information. Therefore, according to the exemplary embodiment, the transmit diversity method can be applied to the underwater communication network system, to improve the communication quality.

While the underwater communication network system for the acoustic communication shown in FIG. 10 depends on the propagation environment. An underwater communication network system shown in FIG. 11, in which all underwater terminals are connected with the base station through cables, does not depend on the propagation environment, different from the underwater communication network system shown in FIG. 10. In the underwater communication network system shown in FIG. 11, it would be possible to perform communication with high rate, high quality and high stability. However, the underwater communication network system shown in FIG. 11 has a problem of restriction on installation location. Since all terminals T21 and T22 are connected with the base station B21 through the cables 11 and 12, respectively, locations where the underwater terminal T21 and T22 are installed are quite limited.

Figure 11:
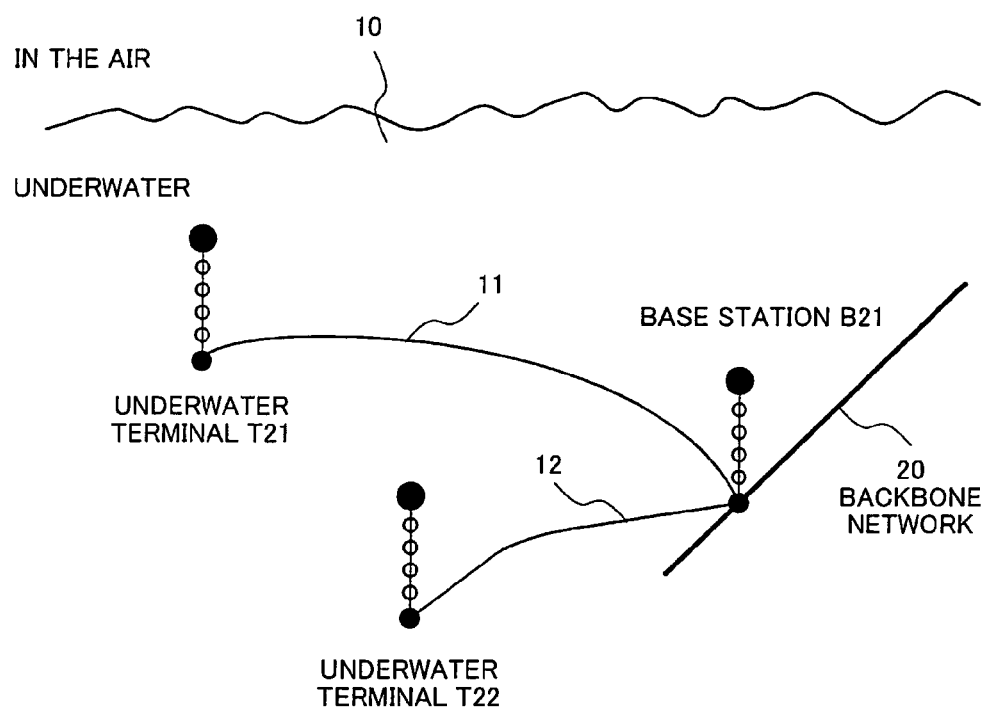
FIG. 11 shows a configuration of another underwater communication network system according to the related art.

Furthermore, according to the underwater communication network systems shown in FIGS. 10 and 11, it is impossible to select a communication path. For this reason, there is also a problem that a propagation path with poor quality may be assigned to urgent communication.

According to the exemplary embodiment, the dependency of the network quality on the individual acoustic communication terminal can be reduced, and the underwater acoustic communication quality of the underwater communication network is improved. The communication quality in the underwater acoustic communication can be maintained stable even in the sea where the propagation environment is unstable. Furthermore, the restriction on installation location for the underwater acoustic communication terminal, which comes with the wired underwater communication network system, can be removed.

Further, the present invention is not limited to the above mentioned exemplary embodiment. According to the exemplary embodiment, as shown in FIG. 2, the cluster 2 includes two terminals. However, the cluster may be extended, for example, to include not less than 3 terminals. In case that, for example, three terminals are connected to the cluster, it is possible to make a configuration of the cluster be star connection type in which a relay device is arranged at the center of the cluster, and each terminal is arranged radially around the relay device to be connected to the relay device. Furthermore, it is possible to extend the network system according to the exemplary embodiment to a network system which includes not less than 3 base stations. The relay device may be incorporated into one of the communication device, i.e. the relay device may have a function to perform communication with the base station.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A communication network system, comprising:
    a cluster including a plurality of communication devices installed underwater and a wired connection connecting at least two of said plurality of communication devices; and
    a base station which performs acoustic communication with at least one of said plurality of communication devices.

2. The communication network system according to claim 1, wherein
    said cluster includes a first communication device and a second communication device,
    said first communication device includes a first terminal transmission unit, which sends information to said second communication device, and
    said second communication device includes a second terminal sending and receiving unit, which sends said information received from said first communication device to said base station.

3. The communication network system according to claim 2, wherein
    said first communication device further includes a first terminal control unit, which detects a state of communication between said first communication device and said base station, and a first terminal sending and receiving unit,
    in case that said state of communication is judged to satisfy a first condition, said first terminal sending and receiving unit sends said information to said base station, and
    in case that said state of communication is judged not to satisfy said first condition, said first terminal transmission unit sends said information to said second communication device.

4. The communication network system according to claim 2, wherein
    said cluster further includes a relay device, which is wiredly connected to said first communication device and to said second communication device,
    said base station includes a base station sending and receiving unit, which sends a probe signal to said first communication device,
    said first communication device further includes a terminal signal processing unit, which generates first receiving information, based on said probe signal,
    said first terminal transmission unit sends said first receiving information to said relay device, and
    said relay device includes a relay device control unit which selects said second communication device from said first and second communication devices, based on said first receiving information.

5. The communication network system according to claim 1, wherein
    said cluster includes a first communication device and a second communication device, and further includes a relay device, which is wiredly connected to said first communication device and to said second communication device,
    said relay device includes a relay device control unit, and
    in case that said second communication device begins to send second information to said base station, during a period from when said first communication device begins to send first information to said base station and until when said first communication device finishes sending said first information, said relay device control unit selects a communication device from said first and second communication devices, which performs communication with said base station.

6. The communication network system according to claim 5, wherein
    said relay device control unit selects said communication device to perform communication with said base station, based on degree of urgency of said first information and degree of urgency of said second information.

7. The communication network system according to claim 5, wherein
    said relay device control unit selects said communication device to perform communication with said base station, based on an amount of said first information and an amount of said second information.

8. The communication network system according to claim 1, wherein
    said cluster further includes a relay device, which is wiredly connected to at least one of said plurality of communication devices, said base station includes a base station sending and receiving unit, which sends a probe signal to said communication device, said communication device includes a terminal signal processing unit, which generates receiving information, based on said probe signal, and a terminal transmission unit, which sends said receiving information to said relay device, said relay device includes a relay device control unit which controls sending time, on which said communication device sends information to said base station.

9. The communication network system according to claim 8, wherein said cluster further includes a first communication device and a second communication device, said first communication device sends information, to be sent to said base station, to said second communication device, said second communication device sends said information received from said first communication device to said base station, and said relay device control unit controls first sending time, on which said first communication device sends said information to said base station, and second sending time, on which said second communication device sends said information to said base station, so that said information from said first communication device and said information from said second communication device arrive at the base station at the same time.

10. The communication network system according to claim 1, wherein said cluster includes a first communication device and a second communication device, said first communication device includes first terminal transmission means, which sends information to said second communication device, and said second communication device includes second terminal sending and receiving means, which sends said information received from said first communication device to said base station.

11. The communication network system according to claim 10, wherein said first communication device further includes first terminal control means, which detects a state of communication between said first communication device and said base station, and first terminal sending and receiving means, in case that said state of communication is judged to satisfy a first condition, said first terminal sending and receiving means sends said information to said base station, and in case that said state of communication is judged not to satisfy said first condition, said first terminal transmission means sends said information to said second communication device.

12. The communication network system according to claim 10, wherein said cluster further includes a relay device, which is wiredly connected to said first communication device and to said second communication device, said base station includes base station sending and receiving means, which sends a probe signal to said first communication device, said first communication device further includes terminal signal processing means, which generates first receiving information, based on said probe signal, said first terminal transmission means sends said first receiving information to said relay device, and said relay device includes relay device control means which selects said second communication device from said first and second communication devices, based on said first receiving information.

13. The communication network system according to claim 1, wherein said cluster includes a first communication device and a second communication device, and further includes a relay device, which is wiredly connected to said first communication device and to said second communication device, said relay device includes relay device control means, and in case that said second communication device begins to send second information to said base station, during a period from when said first communication device begins to send first information to said base station and until when said first communication device finishes sending said first information, said relay device control means selects a communication device from said first and second communication devices, which performs communication with said base station.

14. The communication network system according to claim 13, wherein said relay device control means selects said communication device to perform communication with said base station, based on degree of urgency of said first information and degree of urgency of said second information.

15. The communication network system according to claim 13, wherein said relay device control means selects said communication device to perform communication with said base station, based on an amount of said first information and an amount of said second information.

16. The communication network system according to claim 1, wherein said cluster further includes a relay device, which is wiredly connected to at least one of said plurality of communication devices, said base station includes base station sending and receiving means, which sends a probe signal to said communication device, said communication device includes terminal signal processing means, which generates receiving information, based on said probe signal, and terminal transmission means, which sends said receiving information to said relay device, said relay device includes relay device control means which controls sending time, on which said communication device sends information to said base station.

17. The communication network system according to claim 16, wherein said cluster further includes a first communication device and a second communication device, said first communication device sends information, to be sent to said base station, to said second communication device, said second communication device sends said information received from said first communication device to said base station, and said relay device control means controls first sending time, on which said first communication device sends said information to said base station, and second sending time, on which said second communication device sends said information to said base station, so that said information from said first communication device and said information from said second communication device arrive at the base station at the same time.

18. A communication method for controlling communication between a plurality of communication devices and a base station, the communication devices and the base station being installed underwater, the method comprising:
performing wired communication between at least two of said plurality of communication devices; and
performing acoustic communication between at least one of said plurality of communication devices and said base station.

19. The communication method according to claim 18, further comprising:
sending information from a first communication device to a second communication device, which is wiredly connected to said first communication device; and
sending said information received from said first communication device to said base station.

20. The communication method according to claim 19, further comprising:
detecting a state of communication between said first communication device and said base station;
sending said information from said first communication device to said base station, in case that said state of communication is judged to satisfy a first condition; and
sending said information from said first communication device to said second communication device, in case that said state of communication is judged not to satisfy said first condition.

21. The communication method according to claim 19, further comprising:
sending a probe signal from said base station to said first communication device;
generating first receiving information on said first communication device, based on said probe signal; and
selecting said second communication device from said first and second communication devices, based on said first receiving information.

22. The communication method according to claim 18, further comprising:
selecting a communication device to perform communication with said base station from a first communication device and a second communication device, the second communication device being wiredly connected to said first communication device, in case that said second communication device begins to send second information to said base station, during a period from when said first communication device begins to send first information to said base station and until when said first communication device finishes sending said first information.

23. The communication method according to claim 22, further comprising:
selecting said communication device to perform communication with said base station, based on degree of urgency of said first information and degree of urgency of said second information.

24. The communication method according to claim 22, further comprising:
selecting said communication device to perform communication with said base station, based on an amount of said first information and an amount of said second information.

25. The communication method according to claim 18, further comprising:
sending a probe signal from said base station to one of said plurality of communication devices;
generating receiving information on said communication device, based on said probe signal; and
controlling sending time, on which said communication device sends information to said base station.

26. The communication method according to claim 25, further comprising:
sending information to be sent from a first communication device to said base station, to a second communication device; and
controlling first sending time, on which said first communication device sends said information to said base station, and second sending time, on which said second communication device sends said information to said base station, so that said information from said first communication device and said information from said second communication device arrive at the base station at the same time.

27. A communication device, installed underwater and connected wiredly to another communication device and performing acoustic communication with a base station, comprising:
a terminal transmission unit, which sends information to said another communication device; and
a terminal sending and receiving unit, which sends information to said base station.

28. The communication device according to claim 27, further comprising:
a terminal control unit, which detects a state of communication with said base station, wherein
said terminal sending and receiving unit sends said information to said base station, in case that said state of communication is judged to satisfy a first condition, and
said terminal transmission unit sends said information to said another communication device, in case that said state of communication is judged not to satisfy said first condition.

29. The communication device according to claim 28, further comprising:
a terminal signal processing unit, which generates first receiving information, based on a probe signal sent from said base station, wherein
said terminal transmission unit sends said first receiving information to a relay device, which is wiredly connected to said terminal and said another terminal.

30. A relay device, wiredly connected to a first communication device and a second communication device and performing acoustic communication with a base station, the first and second communication devices and the base station being installed underwater, the first and second communication devices and the relay device forming a cluster, the relay device comprising:
a relay device control unit, which controls at least one of said first and second communication devices, based on information from said controlled communication device.

31. The relay device according to claim 30, wherein
said relay device control unit receives first receiving information, which said first communication device generates, based on a probe signal sent from said base station, and selects said second communication device, based on said first receiving information, and said second communication device receives information sent from the first communication device and sends said received information to said base station.

32. The relay device according to claim 30, wherein
in case that said second communication device begins to send second information to said base station, during a period from when said first communication device begins to send first information to said base station until when said first communication device finishes sending said first information, said relay device control unit selects a communication device to perform communication with said base station from said first and second communication devices.

33. The relay device according to claim 32, wherein
said relay device control unit selects said communication device to perform communication with said base station, based on degree of urgency of said first information and degree of urgency of said second information.

34. The relay device according to claim 32, wherein
said relay device control unit selects said communication device to perform communication with said base station, based on an amount of said first information and an amount of said second information.

35. The relay device according to claim 30, wherein
said relay device control unit receives receiving information, which said a communication device included in said cluster generates based on a probe signal sent from said base station, and controls sending time on which said communication device sends information.

36. The relay device according to claim 35, wherein
said first communication device sends information, to be sent to said base station, to said second communication device,
said second communication device sends said information received from said first communication device to said base station, and
said relay device control unit controls first sending time, on which said first communication device sends said information to said base station, and second sending time, on which said second communication device sends said information to said base station, so that said information from said first communication device and said information from said second communication device arrive at the base station at the same time.

37. A recording medium, to record a program, which makes a computer execute a process to control communication between a plurality of communication devices and a base station, the communication devices and the base station being installed underwater, the process comprising:
a step for performing wired communication between at least two of said plurality of communication devices; and
a step for performing acoustic communication between at least one of said plurality of communication devices and said base station.

* * * * *